United States Patent [19]

Sheen

[11] Patent Number: 5,372,304

[45] Date of Patent: Dec. 13, 1994

[54] TWIST APPLY GRANULAR SPREADER

[76] Inventor: John J. R. Sheen, 102 Main Ter., Sherwood Park, Alberta, Canada, T8A 0R7

[21] Appl. No.: 158,207

[22] Filed: Nov. 29, 1993

[51] Int. Cl.⁵ .................... A01C 15/02; B05B 11/00
[52] U.S. Cl. .................... 239/71; 239/652; 239/154; 239/374; 239/375; 239/559; 222/465.1; 222/565
[58] Field of Search .............. 239/71, 650, 652, 659, 239/152, 154, 374, 375, 559, 567; 222/23, 465.1, 565; 428/34.3; 220/306, 676, 403, 404; 383/113, 117

[56] References Cited

U.S. PATENT DOCUMENTS

| | | | |
|---|---|---|---|
| 934,283 | 9/1909 | Case | 222/465.1 |
| 1,087,727 | 2/1914 | Case | 222/565 |
| 3,485,281 | 12/1969 | Wicks | 383/113 X |
| 4,325,469 | 4/1982 | Gurian | 383/113 X |
| 4,596,363 | 6/1986 | Wellard | 239/375 X |
| 4,709,832 | 12/1987 | Mantyla | 220/306 |
| 4,773,568 | 9/1988 | Schaefer | 239/652 X |
| 4,844,286 | 7/1989 | Jacobson | 220/403 X |

FOREIGN PATENT DOCUMENTS

| | | | |
|---|---|---|---|
| 1110638 | 2/1956 | France | 222/565 |
| 478743 | 1/1938 | United Kingdom | 239/652 |

*Primary Examiner*—William Grant
*Attorney, Agent, or Firm*—Michael J. Colitz, Jr.

[57] ABSTRACT

A twist apply granular spreader comprising a tapered hollow body having an open top end, a closed bottom end, and a wall surface integral with the top and bottom ends for containing and dispersing granular dispersal substances through a multiplicity of apertures in the wall surface. A handle extends from the top end of the spreader body for supporting the body from above during use. A cover lid having a lip rim is detachably coupled to the top end of the spreader body for retaining granular dispersal substances. A channel encompasses the exterior circumference of the top end of the body and accepts the lip rim of the cover lid thus securing the cover lid.

TWIST APPLY GRANULAR SPREADER

BACKGROUND OF THE INVENTION

1. Field of the Invention

The present invention relates to twist apply granular spreaders and more particularly pertains to a twist apply granular spreader which may be used to spread granular dispersal substances evenly by hand in a desired pattern over uneven surfaces or small areas where the use of machinery would not be practicable.

2. Description of the Prior Art

Homeowners often need to disperse an assortment of granular items such as grass seed, rock salt, sand, fertilizer and other materials during the course of care and upkeep of property. Typically, a homeowner will use a mechanical device for dispersing these substances. Such mechanical devices usually consist of a hopper canister, a rotating blade, and a wheeled chassis of various designs. These items are heavy, subject to mechanical wear, and are difficult to use effectively on uneven surfaces and in confined areas. A bucket often suffices for dispersing granular substances in confined areas and uneven surfaces. However, using a bucket and dispersing by hand is tedious and usually results in an uneven application of the substance. The homeowner may have to take additional time to rake or hoe the dispersed substance to render the application even afterwards. This method wastes time and money. The present invention provides a method of achieving an even application of the desired granular substance. A pattern of concentric, staggered apertures in the wall of the device enable an arcuate flow and even dispersal pattern of the contents. Rotating the spreader by employing clockwise and counterclockwise twisting motions of the wrist while supporting the present invention by the handle causes the contents to be forcibly ejected due to resultant centrifugal forces.

A secondary concern addressed by the present invention in consideration of the price and perishable nature of seed and other substances to be dispersed is the storage of remnants. It is quite rare that a homeowner purchases and disperses the exact amount of substance required for a task leaving no excess to store. The present invention includes a moisture-resistant fabric case enclosure for covering the twist apply granular spreader and leftover contents, thus protecting a homeowner's investment in both.

The present invention also addresses the typical homeowner's requirement for utility in areas subject to extremes in weather. The twist apply granular spreader, unlike most mechanical devices, can be used in all seasons, spreading grass seed on fresh soil in the spring, and rock salt on icy slopes in winter.

The use of twist apply granular spreaders is known in the prior art. More specifically, twist apply granular spreaders heretofore devised and utilized for the purpose of dispersing granular substances are known to consist basically of familiar, expected and obvious structural configurations, notwithstanding the myriad of designs encompassed by the crowded prior art which have been developed for the fulfillment of countless objectives and requirements.

The present invention is directed to improving devices for dispersing granular substances in a manner which is safe, secure, economical and aesthetically pleasing.

For example, U.S. Pat. No. 3,759,415 to Cloyd describes a plastic pail having peripheral lips which are compressed by a downwardly presented cover making a fluid tight seal.

U.S. Pat. No. 3,726,039 to Borelli discloses a bicameral pail for storing and retrieving fishing bait.

Another patent of interest is U.S. Pat. No. 4,253,772 to Burton-Smith disclosing a mixing device comprising two offset baffles affixed to the inside of a pail.

U.S. Pat. No. 4,998,622 to Drack describes a plastic pail and lid which is so configured as to provide ease of stacking multiple pails.

Additionally, U.S. Design Patent No. 289,186 to Thomson et al describes an ornamental design for a child's plastic pail.

Finally, U.S. Design Patent No. 269,303 to Goetz et al describes an ornamental design for a pail appurtenance.

The prior art pail configurations mentioned heretofore do not pertain to a twist apply granular spreader which may be used to spread granular dispersal substances evenly by hand in a desired pattern over uneven surfaces or in confined areas where the use of machinery would not be practicable.

In this respect, the twist apply granular spreader according to the present invention substantially departs from the conventional concepts and designs of the prior art, and in so doing provides an apparatus primarily developed for the purpose of spreading granular dispersal substances evenly by hand in a desired pattern over uneven surfaces or in confined areas where the use of machinery would not be practicable.

Therefore, it can be appreciated that there exists a continuing need for new and improved twist apply granular spreaders which can be used to disperse granular substances. In this regard, the present invention substantially fulfills this need.

As illustrated by the background art, efforts are continuously being made in an attempt to simplify the method of spread granular dispersal substances. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of twist apply granular spreaders now present in the prior art, the present invention provides an improved twist apply granular spreader construction wherein the same can be utilized for dispersing granular substances evenly by hand in a desired pattern over uneven surfaces or in confined areas where the use of machinery would not be practicable. As such, the general purpose of the present invention, which will be described subsequently in greater detail, is to provide a new and improved twist apply granular spreader apparatus which has many of the advantages of the twist apply granular spreaders mentioned heretofore and many novel features that result in a twist apply granular spreader which is not anticipated, rendered obvious, suggested, or even implied by any of the prior art twist apply granular spreaders, either alone or in any combination thereof and which has none of the disadvantages of the prior art twist apply granular spreaders.

The invention is defined by the appended claims with the specific embodiment shown in the attached drawings. For the purpose of summarizing the invention, the invention may be incorporated into a new and improved twist apply granular spreader. The twist apply granular spreader comprises a tapered hollow cylindrical spreader body having an open top end, a closed bottom end, and a wall surface integral with and extending between the top and bottom ends for containing and dispersing granular substances. A handle operably coupled to the spreader body extends from the top end of the spreader body for supporting the cylindrical spreader body from above during use. A cover lid having a lip rim is detachably coupled to the top end of the spreader body for retaining granular dispersal substances. A channel encompasses the exterior circumference of the top end of the cylindrical spreader body and accepts the lip rim of the cover lid thus securing the cover lid during use. A multiplicity of apertures for dispersing granular substances pass from the interior wall of the spreader body wall surface to exterior thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Therefore, it is an object of the present invention to provide a new and improved twist apply granular spreader and cover.

It is another object of the present invention to provide a new and improved twist apply granular spreader which may be easily and efficiently manufactured and marketed.

It is a further object of the present invention to provide a new and improved twist apply granular spreader which is of a durable and reliable construction.

An even further object of the present invention is to provide a new and improved twist apply granular spreader which is susceptible of a low cost of manufacture with regard to both materials and labor, and which accordingly is then susceptible of low prices of sale to the consuming public, thereby making such twist apply granular spreaders economically available to the buying public.

Still yet another object of the present invention is to provide a new and improved twist apply granular spreader which provides in the apparatuses and methods of the prior art some of the advantages thereof, while simultaneously overcoming some of the disadvantages normally associated therewith.

Still another object of the present invention is to provide a new and improved twist apply granular spreader which may be used by hand in confined areas.

Yet another object of the present invention is to provide a new and improved twist apply granular spreader which has a secondary purpose of acting as a repository for remnant granular dispersal substances.

Even still another object of the present invention is to provide a new and improved twist apply granular spreader which has no moving parts requiring maintenance.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an elevation view showing the present invention.

FIG. 2 is a top view of the invention showing the lid cover and handle.

FIG. 3 is a perspective view showing a cylindrical body, lid, and channel.

FIG. 4 is a partial cross sectional view of the top end the spreader taken along section 4—4 of FIG. 3, but with the cover lid in place, and showing the cover lid, lip rim, and channel.

DESCRIPTION OF THE PREFERRED EMBODIMENT

Figure 1:
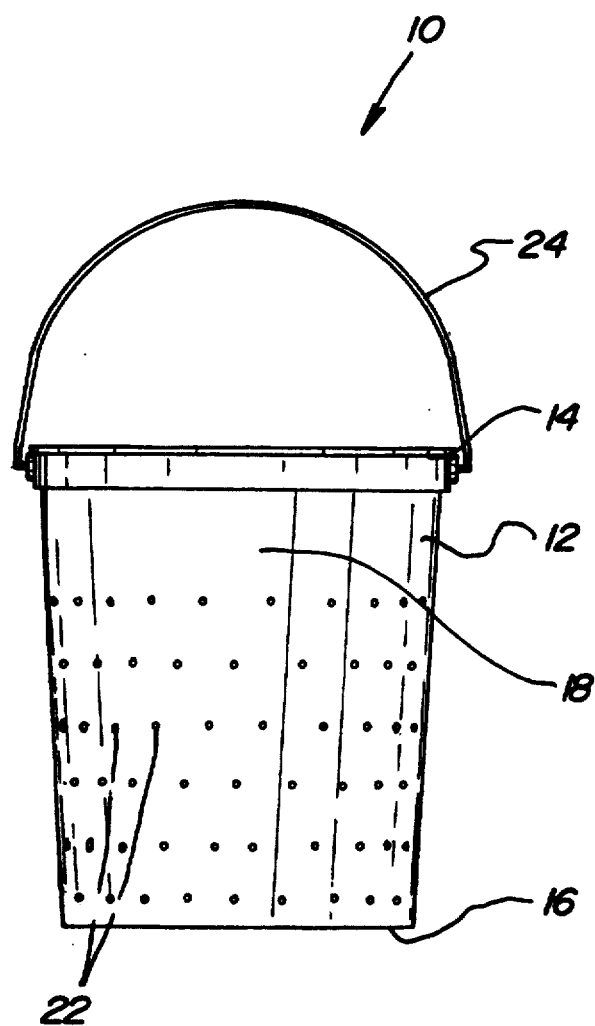
Figure 2:
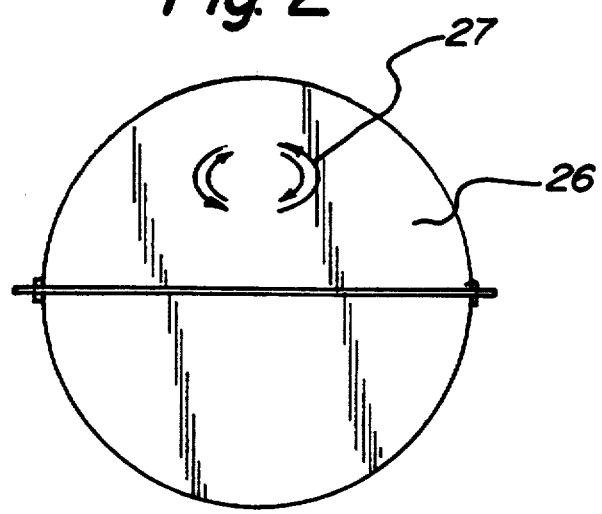
Figure 3:
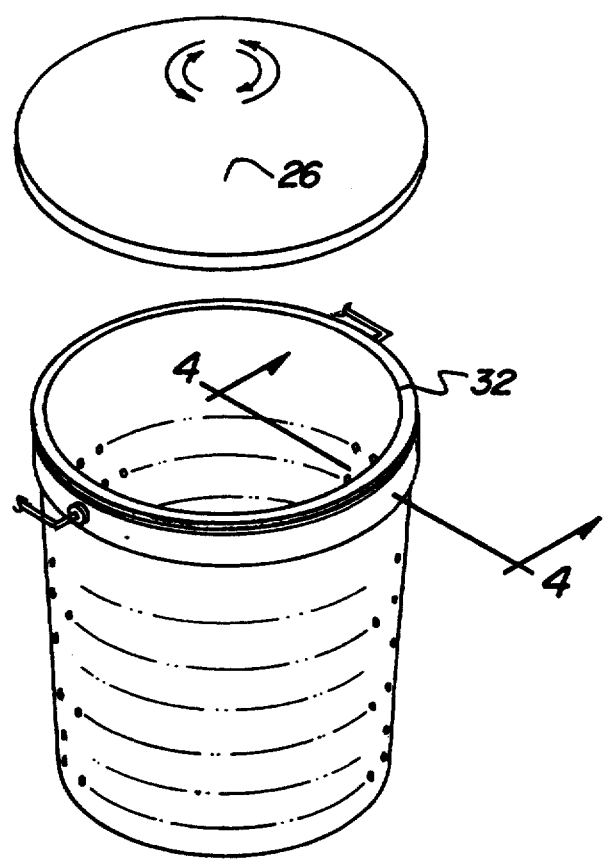
Figure 4:
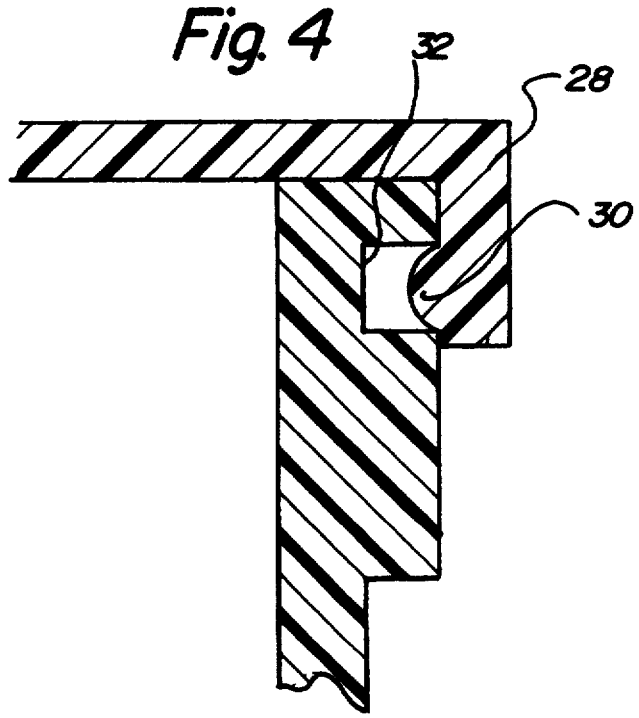
Figure 5:
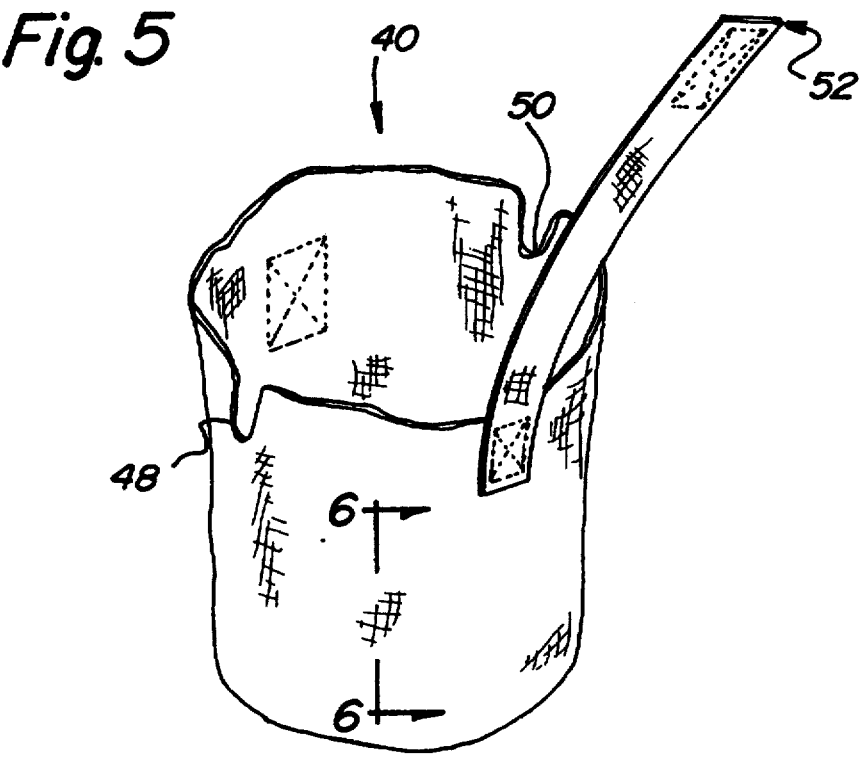
FIG. 5 is a perspective view of a fabric case for enclosing the twist apply granular spreader and contents.
Figure 6:
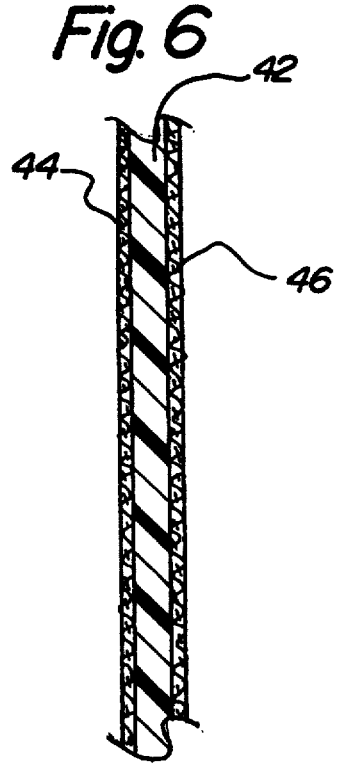
FIG. 6 is a partial cross section of the fabric case showing the moisture-resistant barrier between the interior and exterior fabric covering.

With reference now to the drawings, and in particular to FIG. 1 thereof, a new and improved twist apply granular spreader embodying the principles and concepts of the present invention and generally designated by the reference numeral 10 will be described.

From an overview standpoint, the twist apply granular spreader is adapted for use by a human user for tasks involving the dispersal of granular substances held within. See FIG. 1.

The twist apply granular spreader comprises a tapered hollow cylindrical spreader body 12. The body has an open top end 14, a closed bottom end 16, and a wall surface 18 integral with the top and bottom ends for containing and dispersing granular substances.

Arrayed about the wall surface are a multiplicity of apertures 22 arranged in a staggered, offset pattern in concentric rings about the spreader body wall surface for optimal dispersal of fertilizer, plant food, rock salt, sand and other similar granular dispersal substances. These apertures are preferably arrayed in seven rows with each row ½-inch from the next row vertically above or below. In the preferred embodiment, the holes are 3/16-inch in diameter and are 1-inch from center to center. Each row is staggered so that the hole centers are shifted ½ inch from the centers of the row directly above or below.

A cover lid 26 having a flat top portion and a vertical lip rim 28 orthogonal thereto is detachably coupled to the top end of the spreader body. The cover is seated by interference fit between a bead member 30 formed integral with the lip rim and extending inwardly toward the center of the cover lid. The bead member is seated in a u-shaped channel 32 encompassing the circumference of the top end of the cylindrical spreader body. This arrangement covers the spreader body for retaining dispersal substances. Further, the cover lid includes graphical instruction indicia 27 for disclosing the use of the present invention. Preferably, the instruction indicia comprises a first pair of counter-clockwise pointing arrows positioned around a second pair of clockwise pointing arrows.

A pivoting handle 24 for supporting the cylindrical spreader body from above is operably coupled to the top end of the spreader body. The handle facilitates a dispersal pattern wherein clockwise and counterclockwise rotation of the wrist while supporting the spreader by the handle results in centrifugal force being applied to the contents of the spreader which are then forcibly ejected in a controlled pattern and density as determined by rate and force of wrist rotation and walking speed of the user.

In an alternate embodiment, a fabric case 40 is provided for enclosing and storing the twist apply granular spreader and preserving dispersal substance remnants. The case includes an integral plastic liner 42 placed between an exterior 44 and interior 46 fabric covering to provide a moisture-resistant barrier for protecting dispersal substance remnants. Notches 48 and 50 cut in the sides of the fabric case accommodate the handle 24 during storage of the spreader. A hook and loop strap 52 secures the spreader in the fabric case.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

What is claimed as being new and desired to be protected by Letters Patent of the United States is as follows:

1. A new and improved twist apply granular spreader and case comprising:

a tapered hollow spreader body having a circular cross section with an open top end, a closed bottom end, and a wall surface extending between and integral with the top and bottom ends for containing and dispersing granular substances;

a handle means for supporting the spreader body from above operably coupled to the top end of the spreader body;

a cover lid having a lip rim detachably coupled to the top end of the spreader body for retaining granular dispersal substances;

a U-shaped channel encompassing the circumference of the top end of the cylindrical spreader body for accepting the lip rim of the cover lid;

a multiplicity of apertures extending from interior the wall of the spreader body to exterior thereof for dispersing granular substances;

graphical instruction indicia for describing the motion of the handle means and multiplicity of apertures for facilitating dispersal using clockwise and counter-clockwise rotation of the spreader while supporting the spreader by the handle, the result of which is centrifugal force being applied to the contents of the spreader which are then forcibly ejected in a controlled pattern and density as determined by rate and force of rotation and translational speed of the spreader; and, a fabric case means for enclosing and storing the twist apply granular spreader and preserving dispersal substance remnants, the fabric case means including integral notches in the sides of the fabric case to accommodate said handle during storage of the spreader.

2. The apparatus of claim 1 wherein the fabric case means includes a hook and loop strap to secure the spreader in the fabric case during storage.

3. The apparatus of claim 2 and further including an integral moisture resistant liner placed between an exterior and interior fabric covering to provide a moisture-resistant barrier for dispersal substance remnants.

* * * * *